(12) United States Patent
Masuyama et al.

(10) Patent No.: US 6,973,598 B2
(45) Date of Patent: Dec. 6, 2005

(54) COMPUTER SYSTEM WITH IMPROVED DATA CAPTURE SYSTEM

(75) Inventors: Jinsaku Masuyama, RoundRock, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 486 days.

(21) Appl. No.: 10/058,606

(22) Filed: Jan. 28, 2002

(65) Prior Publication Data
US 2003/0145142 A1  Jul. 31, 2003

(51) Int. Cl.[7] .............................................. G06F 11/00
(52) U.S. Cl. ........................ 714/45; 714/20; 714/37; 714/48
(58) Field of Search ......................... 714/37, 45, 20, 714/31, 48, 25

(56) References Cited

U.S. PATENT DOCUMENTS

| | | | |
|---|---|---|---|
| 5,335,341 A * | 8/1994 | Chana | 714/37 |
| 5,790,777 A * | 8/1998 | Izuta et al. | 714/45 |
| 5,884,019 A * | 3/1999 | Inaho | 714/6 |
| 6,643,802 B1 * | 11/2003 | Frost et al. | 714/37 |
| 2002/0124210 A1 * | 9/2002 | Fields et al. | 714/37 |
| 2003/0051193 A1 | 3/2003 | Pham | 714/42 |
| 2003/0056155 A1 * | 3/2003 | Austen et al. | 714/45 |
| 2003/0191877 A1 * | 10/2003 | Zaudtke et al. | 710/72 |

FOREIGN PATENT DOCUMENTS

JP          2001034510          2/2001

* cited by examiner

Primary Examiner—Scott Baderman
Assistant Examiner—Yolanda L Wilson
(74) Attorney, Agent, or Firm—Baker Botts L.L.P.

(57) ABSTRACT

A computer system has a plurality of sub-systems each comprising a serial interface and a buffer device coupled with the serial interface for buffering crash data sent by the serial interface having an external serial output. The system further comprises a management controller coupled with the external serial output of the buffer device to retrieve data buffered during a crash.

7 Claims, 4 Drawing Sheets

COMPUTER SYSTEM WITH IMPROVED DATA CAPTURE SYSTEM

FIELD OF THE INVENTION

The present invention relates to a computer system, including a plurality of independent sub-systems, a control sub-system and an improved mechanism for handling a crash on a sub-system.

BACKGROUND OF THE INVENTION

Today's computer systems, in particular server systems, comprise often a plurality of sub-systems. Each sub-system can be an independent computer system running its own operating system. For example, a sub-system can comprise a multiple processor architecture running a WINDOWS® operating system. These sub-systems can thus be fully operational computer systems, for example, personal computers or servers which could be coupled with a keyboard, mouse, monitor, etc. A plurality of those sub-systems can be linked and coordinated through a specific dedicated management bus system which is coupled to an embedded server management controller. To this end, each sub-system comprises a so called bridge to couple with the dedicated bus system. As such a dedicated bus system does not need to transfer a lot of data and no critical high speed transfer is required, such a management controller uses for cost reasons often only a standard two wire serial interface. A respective interface is also provided within a bridge of each sub-system. In addition, the respective operating system might have restrictions with respect to certain communication paths in particular in system crash situations. For example, the above mentioned WINDOWS operating system uses one of its serial communication ports to dump crash data.

Whenever one of the sub-systems operating system crashes, it dumps a plurality of data, such as data indicating the circumstances of the crash, through the serial interface. However, in a system with multiple sub-systems the management controller is responsible to provide in-band and out-of-band server management for all installed sub-systems. To this end, the management controller only enables one serial interface on one sub-system at a time and switches between different sub-systems on regular intervals. Hence, the management controller provides a multiplexed console redirection to the remote sub-systems. Even so this architecture is satisfactory during normal operation, whenever one system fails it cannot always be guaranteed that the management controller receives all necessary data to be able to identify the respective details of a sub-systems failure.

SUMMARY OF THE INVENTION

Therefore, a need for an improved multiple sub-system server architecture which overcomes the above mentioned problems exists.

A first embodiment comprises a computer system having a plurality of sub-systems each comprising a serial interface and a buffer device coupled with the serial interface for buffering crash data sent by the serial interface having an external serial output. The system further comprises a management controller coupled with the external serial output of the buffer device to retrieve data buffered during a crash.

A method of operating a computer system comprises a plurality of sub-systems each running independently an operating system and a management controller coupled with the plurality of sub-systems, the method comprising the steps of:

upon a system crash outputting a crash dump file through a serial port of the sub-system;
buffering the crash dump file;
generating a control signal for a management controller;
upon request by the management controller coupling the management controller with the sub-system; and
transferring the buffered crash dump file to the management controller.

Yet another embodiment of a computer system comprises a plurality of independent sub-systems each running a operating system that outputs a crash dump through a serial port and generates a control signal upon a system crash, a management controller having a control input, a serial bus interface coupled with a communication line, and a serial input. Each sub-system comprises a microcontroller having a control input, a memory, and a serial input port coupled with the serial port and a serial output port, a controller unit having a serial bus interface for coupling with the management controller and an input for receiving the control signal and generating an external control signal fed to the control input of the management controller and an output for an internal control signal fed to the microcontroller, and a switch controlled by the controller unit for coupling the serial output port with the external communication line.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
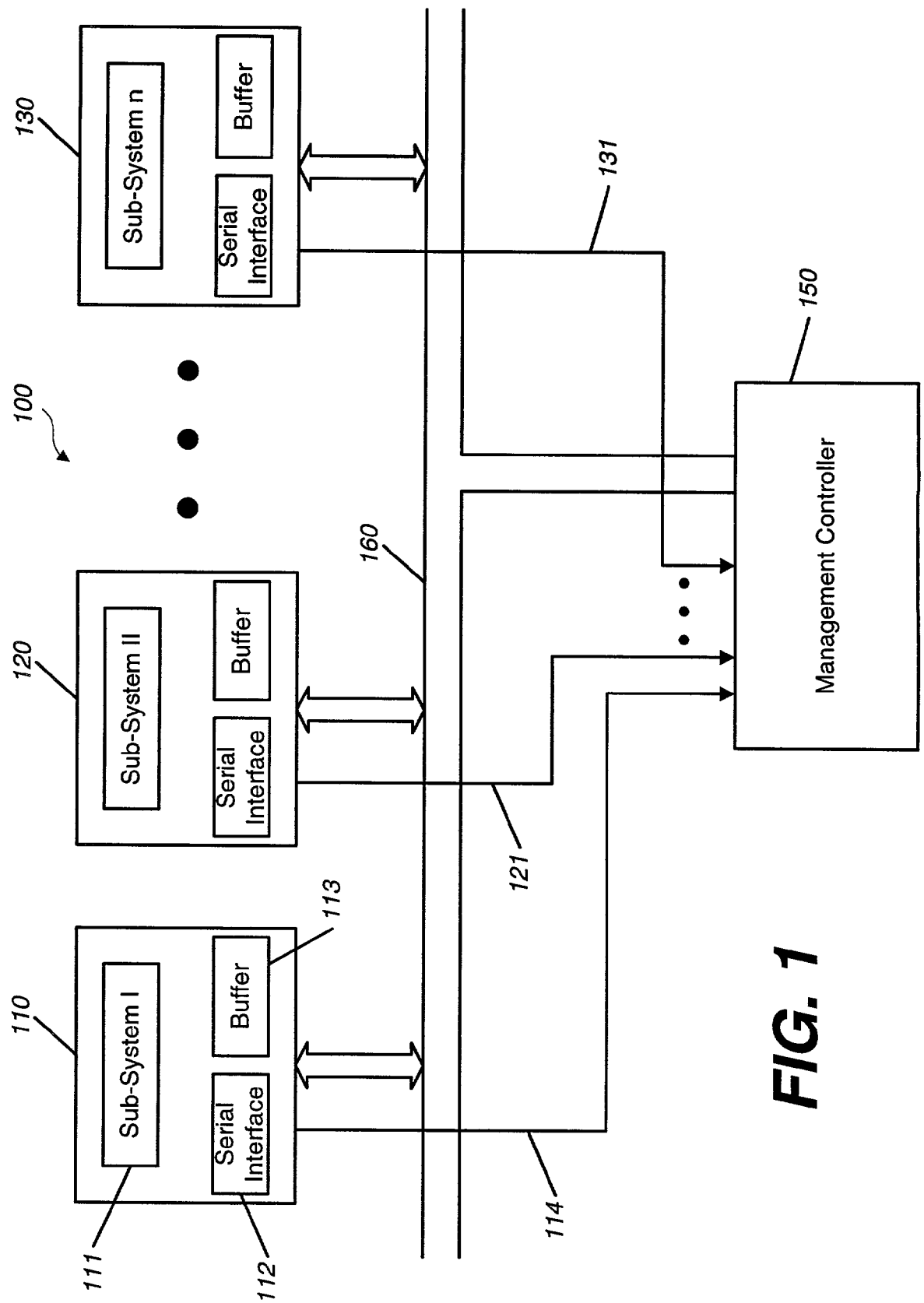
FIG. 1 is a block diagram of an exemplary embodiment according to the present invention.

Turning to the drawings, exemplary embodiments of the present application will now be described. FIG. 1 shows a block diagram of a computer server system 100. Such a system comprises a plurality of sub-systems 110, 120, . . . 130. Each sub-system 110, 120, . . . 130 is an independent computer system, such as a personal computer or a single server. Usually only the motherboards of these computers or servers are used and placed into a rack or tower system. Every sub-system 110, 120, . . . 130 comprises the respective components 111, such as a central processing unit, memory, peripheral interfaces, etc. Usually only one keyboard, mouse and monitor (not shown) are coupled with a keyboard-mouse-monitor managing unit (KVM, not shown) which selectively couples the KVM with one of the sub-systems.

In FIG. 1 a serial interface is indicated by numeral 112. This serial interface 112 is one of the peripherals which are on the motherboard of a computer system and is usually a standard RS232 compatible serial interface. In addition, according to the present invention, a serial buffer 113 is provided. The serial buffer 113 is internally coupled to the serial interface and buffers all outgoing data. The serial buffer of each sub-system 110, 120, . . . 130 is coupled through a bus system 160, such as a SPI-bus, I²C-bus, Micro-wire, universal system bus (USB) or any other suitable serial bus system with a management controller 150. In addition each system can generate a non-maskable interrupt which is further directed to the server management controller through interrupt lines 114, 121, . . . 131.

In operation, the management controller 150 is activated through one of the interrupt lines 114, 121, . . . 131. Whenever the operating systems in one of the sub-systems 110, 120, . . . 130 crashes it dumps its crash data through the serial interface. This dump is usually relatively uncontrolled as the operating system in this moment due to the nature of a crash does not operate very reliable anymore. Each operating system has its own procedure of sending such a "last call" before completely shutting down. Many operating systems are using the monitor to indicate to a user what happened and in addition sending a detailed dump through the serial interface. However, the monitor dump or signal is not very useful as the respective sub-system might not be connected to the KVM at the time of a crash. According to the present invention, a serial buffer is installed on each sub-system 110, 120, . . . 130. Which receives and stores the crash dump data. Through the interrupt lines 114, 121, . . . 131 the respective sub-system that crashed indicates to the management controller 150 that its operating system crashed. After this signal has been sent, the management controller 150 retrieves the respective crash data from the respective sub-system through bus 160. Thus, no data will be lost and the system crash within one of the sub-systems 110, 120, . . . 130 can be fully evaluated. In another embodiment, the buffer 113 can comprise only a standard serial interface. In this case, the management controller 150 can comprise a plurality of serial interfaces to connect to each sub-system 110, 120, . . . 130 or a single serial interface and a controllable switch which selectively couples the controller 150 with one of the serial interfaces of the sub-systems 110, 120, . . . 130.

Figure 2:
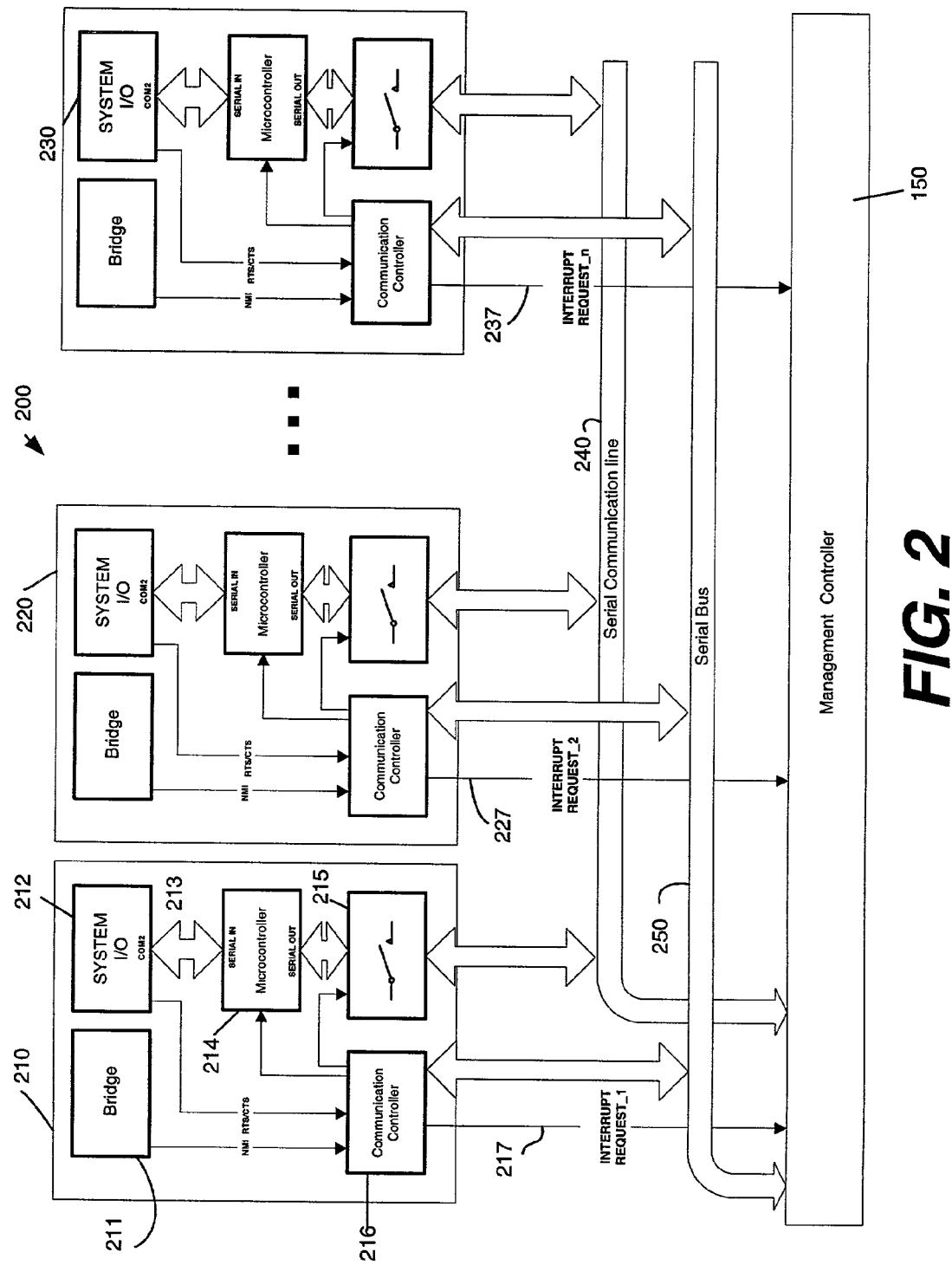
FIG. 2 is a block diagram of another exemplary embodiment according to the present invention.

FIG. 2 shows another embodiment of a server system 200 according to the present invention. The server system 200 comprises a plurality of sub-systems 210, 220, . . . 230. Each sub-system 210, 220, . . . 230 includes amongst the usual system components a system I/O 212, for example a serial communication port such as a COM port in a personal computer system for generating serial transmission signals and serial port control signals. Furthermore, a bridge 211 is implemented for generating other control signals, such as interrupt signals. A special interface device is a communication controller 216 which receives the signals from bridge 211 and from the system I/O and generates a plurality of internal and external control signals. It is also used to communicate with the external management controller 150 through a serial bus system 250 and through interrupt lines 217, 227, . . . 237. A microcontroller 214 comprises a serial port which is coupled with the system I/O serial port 212. The microcontroller 214 comprises its own memory and peripherals. A switch 215 is coupled with another serial port of microcontroller 214. The switch 215 is furthermore coupled with a serial input of management controller 150 through serial coupling 240.

In this embodiment a standard motherboard including some modifications is used. The additional microcontroller 214 on each sub-system 210, 220, . . . 230 is used to buffer any type of crash dump so it won't be lost and can be retrieved at a later time. Such a microcontroller does not have to be a high performance microcontroller and can comprise for example one or two serial standard ports (RS232) and sufficient dynamic or static memory to buffer the outgoing crash dump. If only one serial port is implemented, the receiving line (RX, input) will be coupled with the COM port of the sub-system 210, 220, . . . 230 and the transmitting line (TX, output) will be connected with the switch 215. Once a system crash occurs in one of the sub-systems 210, 220, . . . 230, the respective bridge 211 asserts a non maskable interrupt and the ready to send signal RTS is generated by the system I/O. The communication controller 216 then signals to the microcontroller 214 that data will be sent to the microcontroller 214. The microcontroller then transfers the incoming data to its memory for later retrieval. While this is happening, the communication controller asserts an external interrupt which is fed to the management controller 150. The management controller 150 then starts the retrieving procedure. It first sends a command through the serial bus addressing the sub-system which sent the interrupt and prepares itself for reception of the crash dump file. The communication controller 216 sends a respective command to the microcontroller 214 to initiate a data transfer through its second serial interface. In addition, communication controller 216 activates the switch 215. Thus, only one transmitter is coupled to the serial connecting line 240 and no data collision can occur. Next, the microcontroller 214 sends the crash dump previously stored in its memory to the management controller 150 which will further analyze this data. After completion of the transfer, the communication controller 216 controls the switch 215 to decouple the serial port from the connecting line 240.

Figure 3:
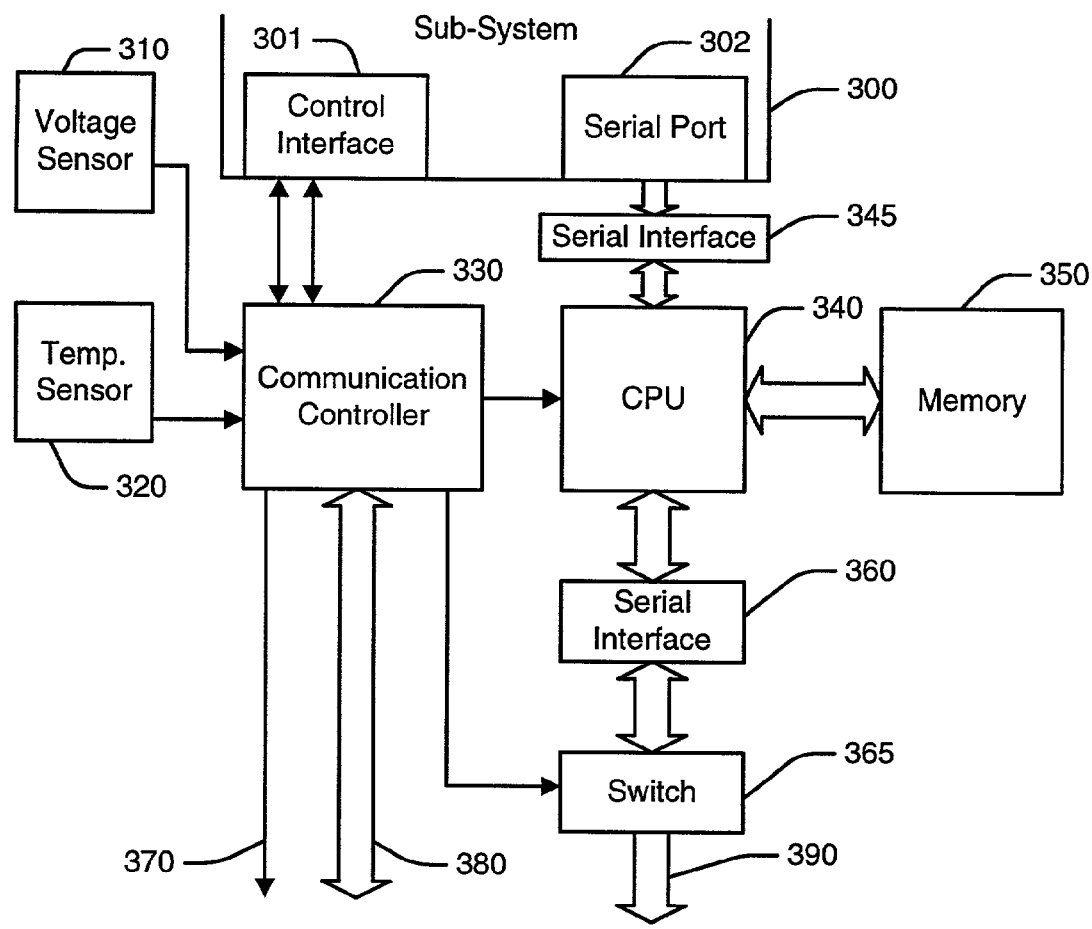
FIG. 3 is a block diagram showing parts of a single sub-system in more detail.

FIG. 3 shows the relevant parts of a sub-system 210, 220, . . . 230 in more detail. A motherboard 300 comprises a serial port 302 forming the system I/O, such as the COM2 port of a personal computer or server. Furthermore, a control interface 301 forming the bridge is implemented to provide other control signals, such as an interrupt signal. The communication controller 330 is coupled with the serial interface control signals and furthermore can receive signals from a voltage detector 310 and a temperature sensor 320. The communication controller 330 provides a serial bus interface 380, such as a SPI-bus, an I2C bus, or any other suitable serial bus interface. Furthermore, an interrupt signal 370 is generated by the communication controller 330. The microcontroller comprises amongst others a central processing unit 340 (CPU) which is coupled with the serial port 302 through a first serial interface 345. Furthermore, the microcontroller has a memory 350 which is coupled with its CPU 340. A second serial interface 360 of the microcontroller is coupled with the CPU and a switch 365 which couples the serial interface 360 with the external serial communication line 390. The switch is controlled by the sub-system communication controller 330.

The management controller 150 is primarily responsible to determine the environmental status of the server system. To this end, for example, each sub-system comprises respective voltage sensors 310 and temperature sensors 320. The sub-system communication controller 330 is providing the management controller 150 constantly with information about the supply voltage and the temperature of each individual system. According to the present invention, the management controller is also responsible for documenting and analyzing a system crash of one of the sub-systems. As each sub-system is dumping the respective crash dump file through its serial port upon a crash, the CPU 340 of the microcontroller is buffering this file in its memory 350 and transferring it upon request to the management controller 150 as described above.

Figure 4:
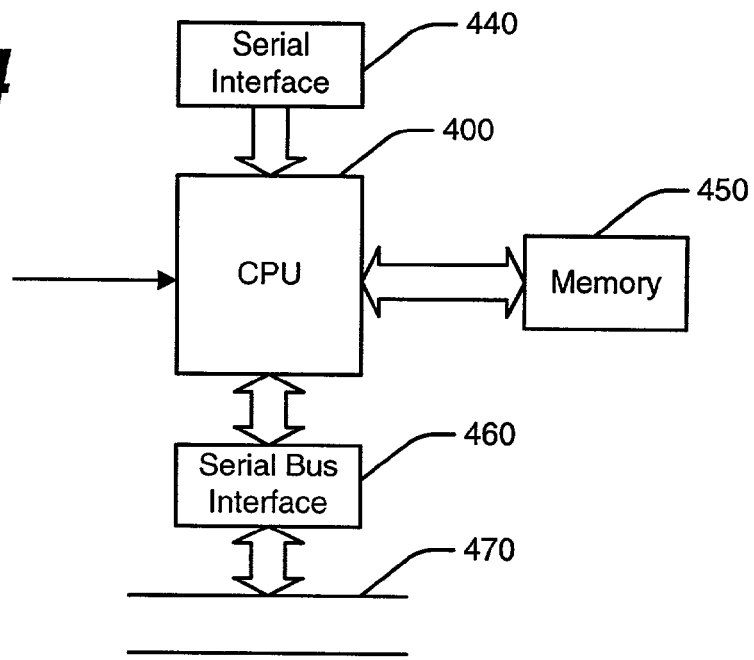
FIG. 4 is another embodiment of a single sub-system.

FIG. 4 shows another possible embodiment. Only the relevant parts which are different from FIGS. 2 and 3 are shown in FIG. 4. Here, the CPU 400 is coupled again through a standard RS232 serial interface 440 with the sub-system (not shown). Again, the CPU 400 is coupled with a memory 450. In contrast to FIG. 3, this embodiment is using a serial bus interface, such as a universal interface bus 460 (USB) or an I²C bus which couples the CPU 400 with an external USB-bus 470. Thus, no switch is needed in this embodiment as all serial interfaces can be coupled with the serial bus 470. The respective arbitration protocol of the serial bus system will prevent any type of collision which renders the data unusable.

In case of a system crash of one of the sub-systems, the CPU 400 will again buffer all crash related data within its memory 450. Once the CPU has stored all crash data in a respective file it can transmit a command through the serial bus interface 460 to the management controller 150 indicating that a crash occurred. This message can include identification data about the respective sub-system. As soon as the management controller is ready to receive the crash dump it can indicate this to the respective sub-system by sending a command through the serial bus interface 460. Upon reception of this command, the CPU 400 transfers the crash dump file from its memory 450 to the external management controller. In this embodiment, the sub-system controller can be minimized. There is no need to provide a serial bus interface in this controller as the serial bus interface 460 of the microcontroller can be used. In addition, no external interrupt signal has to be generated. The internal interrupt can be directly fed to the CPU 400.

Figure 5:
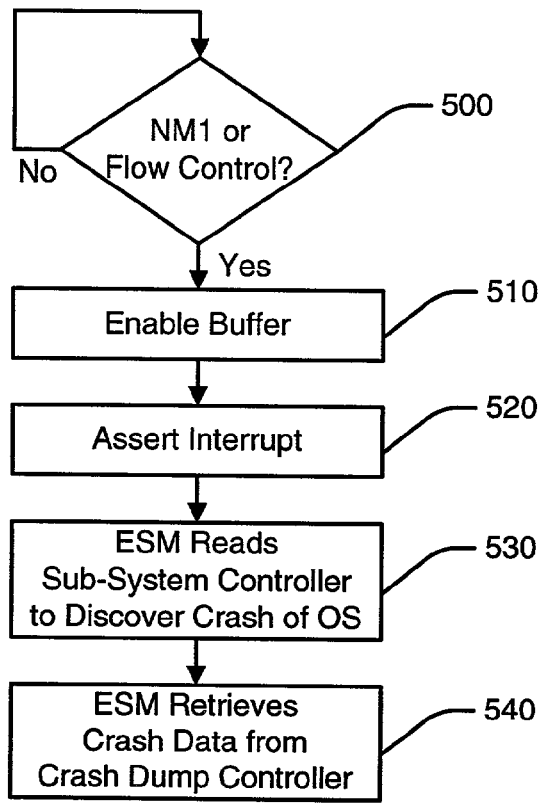
FIG. 5 is a flow chart showing a method to retrieve crash dump data according to one of the embodiments of the present invention.

FIG. 5 shows a flow chart of the procedure with an embodiment according to FIGS. 2 and 3. In step 500 the status of the non-maskable interrupt or the flow control signals is monitored. If such a signal is asserted the procedure proceeds to step 510 where the buffer system is enabled. In step 520 the external interrupt will be asserted signaling to the management system that a system crash in one of the systems occurred. In step 530 the management controller reads the sub-system communication controller's information, thus discovering that the particular system crashed. Finally in step 540, the management system retrieves the crash data from the microcontroller's memory.

The present invention has the particular advantage, that a standard motherboard can be used without modification. In such an application an additional microcontroller can be provided as an extension on a specifically designed card within the housing of the server for each sub-system separately or combined depending on whether sub-system specific sensor are used or not.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system, comprising:
a plurality of independent sub-computer systems, wherein each system comprises,
a serial interface;
a buffer device coupled with the serial interface for buffering crash data sent by the serial interface having an external serial output;
a microcontroller having a memory and a serial input coupled with the serial interface and a serial output;
a communication controller; and
a switch coupled with the serial output, wherein the switch is controlled by the communication controller; and
a management controller coupled with the external serial output of the buffer device of each independent sub-computer system to retrieve data buffered during a crash.

2. A method of operating a computer system comprising a plurality of independent sub-computer systems, each running independently an operating system and a management controller coupled with the plurality of sub-systems, comprising:
upon a system crash of one of the independent sub-computer systems outputting a crash dump file through a serial port of the respective independent sub-computer system;
buffering the crash dump file;
generating a control signal for a management controller;
upon request by the management controller coupling the management controller with the sub-system wherein the coupling of the management controller with the sub-system includes the coupling of a serial output of the sub-system with a serial communication line coupled with the management controller through a switch; and
transferring the buffered crash dump file to the management controller.

3. A computer system, comprising:
a plurality of independent sub-systems each running a operating system that outputs a crash dump through a serial port and generates a control signal upon a system crash;
a management controller having a control input, a serial bus interface coupled with a communication line, and a serial input;
wherein each sub-system comprises:
a microcontroller having a control input, a memory, and a serial input port coupled with the serial port and a serial output port;
a controller unit having a serial bus interface for coupling with the management controller and an input for receiving the control signal and generating an external control signal fed to the control input of the management controller and an output for an internal control signal fed to the microcontroller;

a switch controlled by the controller unit for coupling the serial output port with the external communication line.

4. The computer system of claim 3, wherein the control signal and the external control signal are interrupt signals.

5. The computer system of claim 3, wherein the serial input and output ports are part of an RS232 serial interface.

6. A computer system, comprising:
a plurality of independent sub-computer systems, wherein each sub-computer systems comprises:
a serial interface;
a buffer device coupled with the serial interface for buffering crash data sent by the serial interface having an external serial output;
an interrupt signal output;
a microcontroller having a memory and a serial input coupled with the serial interface and a serial output;
a communication controller; and
a switch coupled with the serial output, wherein the switch is controlled by the communication controller; and
a management controller coupled with the external serial output of the buffer device of each independent sub-computer system and with each interrupt signal output to retrieve data buffered during a crash.

7. The computer system of claim 6, wherein the communication controller is coupled with the management controller through a serial bus.

* * * * *